(12) United States Patent
Schalles et al.

(10) Patent No.: US 10,429,072 B2
(45) Date of Patent: Oct. 1, 2019

(54) REGENERATIVE BURNER FOR NON-SYMMETRICAL COMBUSTION

(71) Applicant: Bloom Engineering Company, Inc., Pittsburgh, PA (US)

(72) Inventors: David G. Schalles, Jefferson Hills, PA (US); Gregory T. Kitko, Coraopolis, PA (US)

(73) Assignee: Bloom Engineering Company Inc., Pittsburgh, PA (US)

( * ) Notice: Subject to any disclaimer, the term of this patent is extended or adjusted under 35 U.S.C. 154(b) by 0 days.

(21) Appl. No.: 15/022,361

(22) PCT Filed: Sep. 18, 2014

(86) PCT No.: PCT/US2014/056260
§ 371 (c)(1),
(2) Date: Mar. 16, 2016

(87) PCT Pub. No.: WO2015/042237
PCT Pub. Date: Mar. 26, 2015

(65) Prior Publication Data
US 2016/0223203 A1    Aug. 4, 2016

Related U.S. Application Data

(60) Provisional application No. 61/881,163, filed on Sep. 23, 2013.

(51) Int. Cl.
*F23R 3/44* (2006.01)
*F23L 15/02* (2006.01)
(Continued)

(52) U.S. Cl.
CPC ............. *F23R 3/44* (2013.01); *F23C 6/045* (2013.01); *F23C 7/00* (2013.01); *F23C 9/006* (2013.01);
(Continued)

(58) Field of Classification Search
CPC .......... F23C 9/006; F23D 14/22; F23L 15/02; F23R 3/44
(Continued)

(56) References Cited

U.S. PATENT DOCUMENTS

| | | |
|---|---|---|
| 3,876,362 A | 4/1975 | Hirose |
| 3,947,216 A | 3/1976 | Teodorescu et al. |

(Continued)

*Primary Examiner* — Avinash A Savani
*Assistant Examiner* — Aaron H Heyamoto
(74) *Attorney, Agent, or Firm* — The Webb Law Firm

(57) ABSTRACT

Regenerative burner for non-symmetrical combustion and a method of firing the burner. The burner includes a burner housing enclosing a burner plenum; a fuel conduit extending longitudinally within the housing and positioned coaxial with a line spaced from a central axis of the burner, with the fuel conduit defining a fuel exit opening; and a baffle positioned at least partially around the fuel conduit and defining an air conduit extending into the housing and defining an air opening on an opposite side of the burner central axis from the fuel exit opening. The baffle also defines a cavity adjacent the fuel exit opening and in communication with the fuel conduit through the fuel exit opening. The sidewall of the cavity converges from a central axis of the fuel conduit to provide further jet penetration into the furnace and achieve greater levels of products of combustion entrainment prior to combustion.

19 Claims, 4 Drawing Sheets

(51) Int. Cl.
    *F23C 6/04*          (2006.01)
    *F23C 7/00*          (2006.01)
    *F23C 9/00*          (2006.01)
    *F23D 14/22*         (2006.01)
    *F27D 17/00*         (2006.01)
    *F27D 99/00*         (2010.01)

(52) U.S. Cl.
    CPC .............. *F23D 14/22* (2013.01); *F23L 15/02* (2013.01); *F27D 17/004* (2013.01); *F27D 99/0033* (2013.01); *F23C 2900/09002* (2013.01); *Y02E 20/348* (2013.01)

(58) Field of Classification Search
    USPC ....................................... 431/12, 8, 160, 354
    See application file for complete search history.

(56) References Cited

U.S. PATENT DOCUMENTS

| | | | |
|---|---|---|---|
| 4,181,491 A | 1/1980 | Hovis | |
| 5,100,313 A | 3/1992 | Anderson et al. | |
| 5,407,345 A | 4/1995 | Robertson et al. | |
| 5,814,121 A | 9/1998 | Travis | |
| 6,471,508 B1 * | 10/2002 | Finke | F23C 9/006 431/11 |
| 6,793,486 B2 | 9/2004 | Finke et al. | |
| 7,531,015 B2 | 5/2009 | Wolf et al. | |
| 2005/0239005 A1 * | 10/2005 | Lugnet | F23C 9/006 431/8 |
| 2007/0062197 A1 * | 3/2007 | Hannum | B01B 1/005 60/737 |
| 2012/0094239 A1 * | 4/2012 | Miura | F23D 14/64 431/9 |

* cited by examiner

Inventive Configuration

Prior Art Configuration

REGENERATIVE BURNER FOR NON-SYMMETRICAL COMBUSTION

CROSS REFERENCE TO RELATED APPLICATIONS

The present application claims priority from U.S. Provisional Patent Application No. 61/881,163, filed on Sep. 23, 2013, which is incorporated herein by reference in its entirety.

BACKGROUND OF THE INVENTION

Field of the Invention

This invention relates to industrial burners and, more specifically, to regenerative burners which reduce NOx emissions.

Description of Related Art

Conventional industrial burners are typically configured in a symmetrical fashion. In this symmetrical configuration, a fuel conduit is generally disposed axially along a centerline of the burner and combustion air is generally introduced immediately about a periphery of the fuel conduit or, with appropriate air ducting, symmetrically about the fuel conduit and radially spaced therefrom. A prior art example of a symmetrical industrial burner is disclosed by U.S. Pat. No. 3,876,362 to Hirose. The symmetrical or "axial" burner disclosed by the Hirose patent attempts to induce a deflected stream of gas from the burner by providing an air inlet in the burner tile structure. The positive axial mass flux of the air and fuel jets cause a recirculation of the products of combustion from the furnace chamber into the burner tile. This induction of the products of combustion into the burner tile and subsequent entrainment into the fuel and air streams causes lower flame temperatures and lower NOx production rates.

However, a burner that could obtain NOx levels even lower than those disclosed in the Hirose patent was needed especially with respect to regenerative burners.

U.S. Pat. No. 6,471,508 to Finke at al., the entire contents of which are incorporated herein by reference, discloses a burner that uses non-symmetrical combustion to obtain NOx levels lower than those disclosed in the Hirose patent. In the disclosed burner, the fuel conduit is coaxial with a line spaced from the central axis of the burner. The air conduit is placed on the opposite side of the burner central axis from the fuel conduit. This configuration demonstrates a reduction in NOx levels over those disclosed by Hirose when used in a recuperative burner having air preheat temperatures of around 800° F. (see Table 1). However, when this configuration is used in a regenerative burner where the air may be preheated to >2000° F., the NOx levels, while reduced, are not reduced to the same low levels as those experienced with the recuperative burner. This is partially due to the fact that the low density highly preheated air requires the opening for the conduit for combustion air (passage 36 in the Finke patent) to be enlarged to pass the needed air flow at reasonable pressures, as compared to the lower air temperature recuperative burner. This larger opening is necessarily spaced closer to the fuel opening and, therefore, allows the air flow to mix more quickly with the fuel which tends to increase NOx.

Thus, an improvement to the burner disclosed in the Finke patent is needed to allow lower NOx levels to be achieved in a non-symmetrical regenerative burner.

SUMMARY OF THE INVENTION

The present invention is directed to a burner for non-symmetrical combustion having a burner housing enclosing a burner plenum. The burner plenum may be at least partially filled with heat transfer media.

A fuel conduit extends longitudinally within the housing and is positioned coaxial with an axis spaced from the central axis of the burner. The fuel conduit defines a fuel exit opening, which may be a high velocity nozzle. An end of the fuel conduit adjacent the fuel exit opening may also be tapered.

A baffle is positioned at least partially around the fuel conduit and defines an air conduit that extends into the housing. The air conduit defines an air opening on an opposite side of the burner central axis from the fuel exit opening and may have a cross-sectional shape in the form of a segment of a circle defined by a chord. The air opening may be positioned a greater distance away from the burner central axis than the fuel exit opening.

The baffle also defines a cavity immediately adjacent the fuel exit opening and in fluid communication with the fuel conduit through the fuel exit opening, wherein the sidewall of the baffle defining the cavity converges from a central axis of the fuel conduit. The cavity may have the shape of a truncated cone and may be coaxial with the fuel conduit.

The burner may further comprise a burner port block connected to the baffle and located downstream of and in fluid communication with the fuel conduit and the air conduit. The baffle separates the burner port block from the burner plenum. The sidewall of the burner port block may diverge from the burner central axis, preferably at a flare angle of between 2° and 30°.

The burner may further comprise an air conduit extending through the burner plenum and connecting to the cavity, wherein the fuel conduit is positioned within the air conduit. The air conduit may include swirl vanes.

Alternatively, the fuel conduit may be positioned at least partially within the baffle such that an outer surface of the fuel conduit and the sidewall of the baffle define an annular opening extending from the burner plenum to the cavity.

The present invention is also directed to a method of non-symmetric combustion in a burner. A burner is provided that comprises: a fuel conduit coaxial with a first axis having a fuel exit opening; an air conduit coaxial with a second axis; a baffle positioned at least partially around the fuel conduit and defining the air conduit; and a burner port block having a diverging sidewall connected to the baffle and in fluid communication with the fuel conduit and air conduit. The baffle further defines a cavity immediately adjacent the fuel exit opening such that a sidewall of the baffle defining the cavity converges from the first axis.

Fuel is injected through the fuel conduit into the burner port block along the first axis, which is spaced from a central axis of the burner.

Combustion gas is discharged through the air conduit into the burner port block along the second axis. The second axis is positioned on an opposite side of the burner central axis from the first axis. The combustion gas may be discharged at a velocity of greater than about 250 feet per second into the burner port block.

The combustion gas is induced to flow toward the diverging sidewall of the burner port block. The combustion gas and the injected fuel are mixed and ignited and the products of combustion are recirculated into the discharging combustion gas.

BRIEF DESCRIPTION OF THE DRAWING(S)

Figure 4:
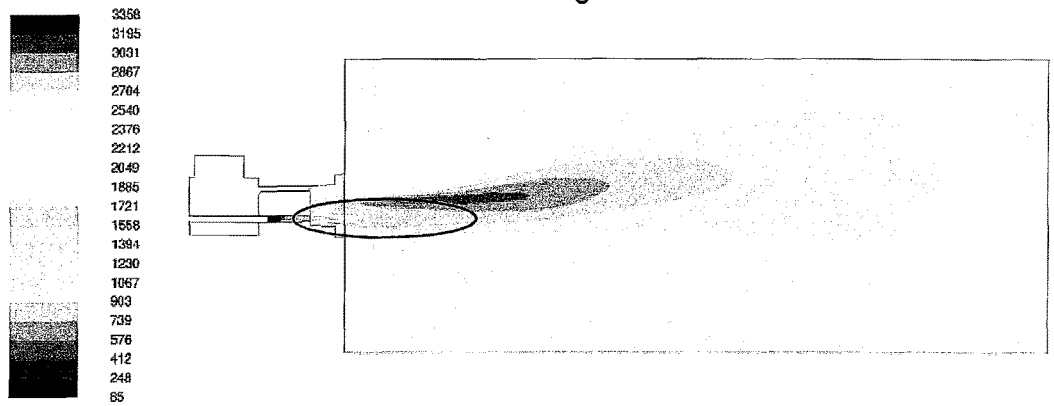
Figure 4:
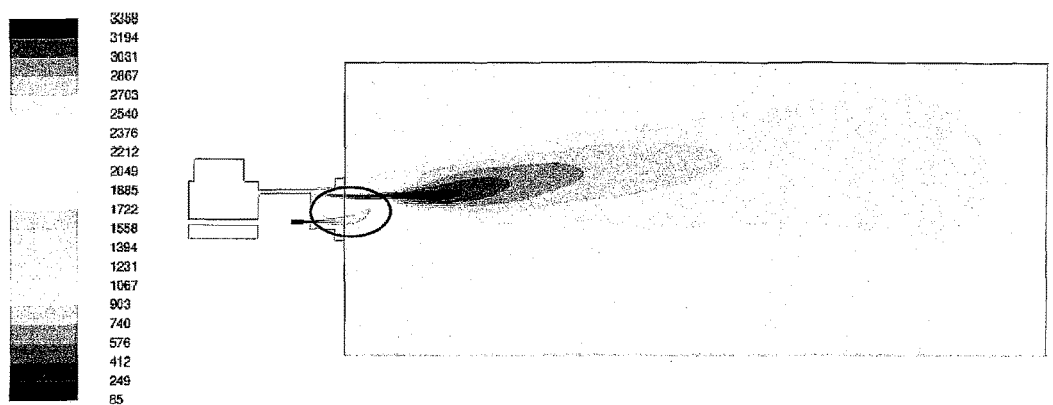
Figure 5:
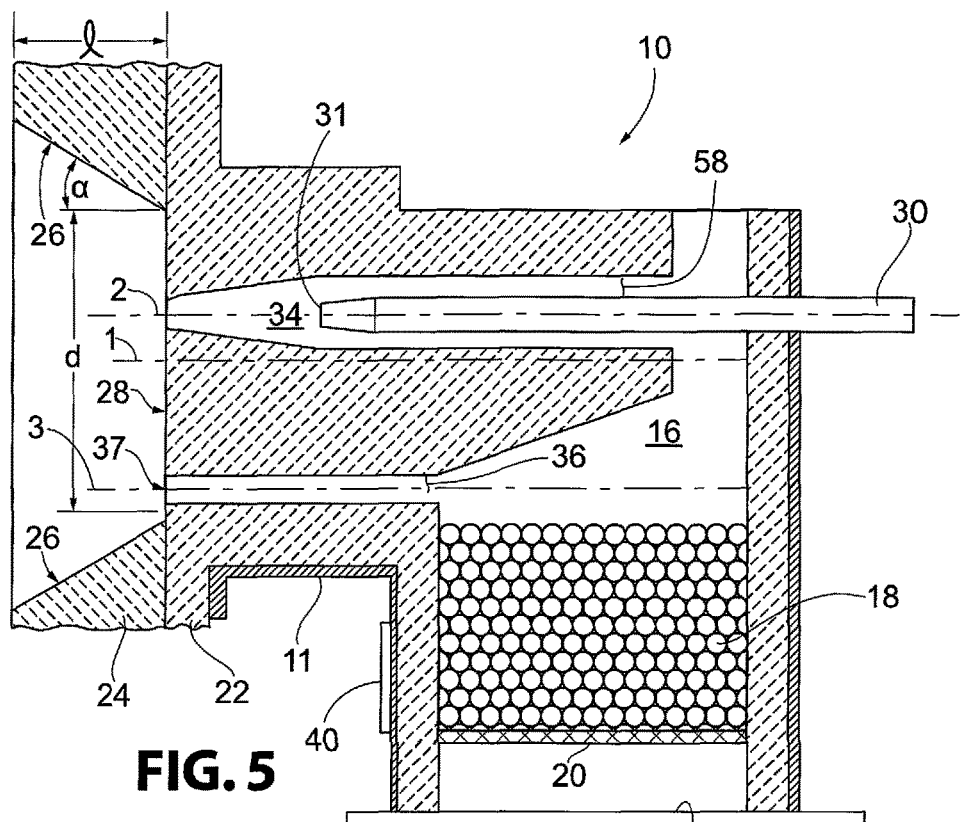
Figure 6:
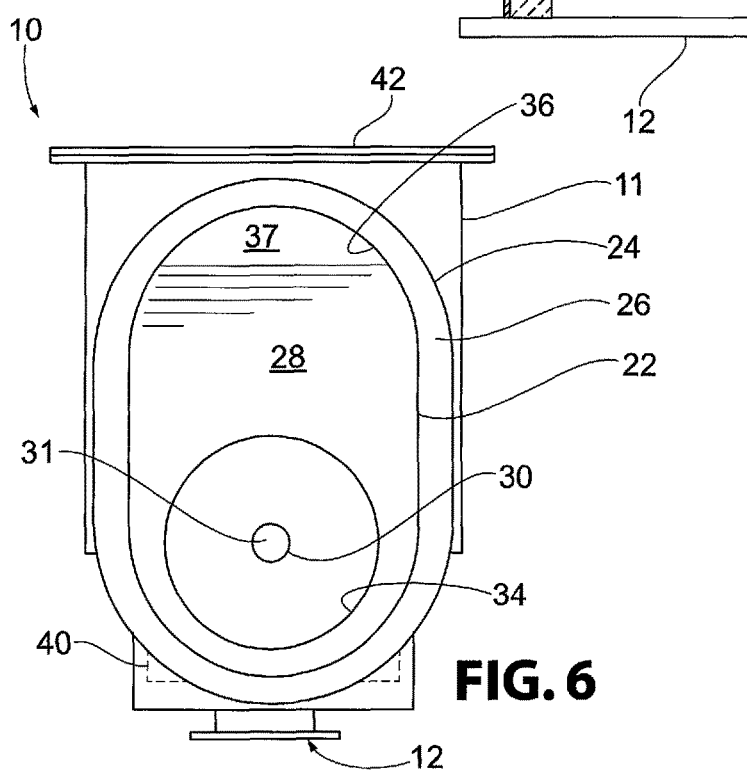

FIG. 4. shows a comparison of the temperature profile for the products of combustion for a prior art regenerative burner configuration and the inventive regenerative burner configuration;

FIG. 5 is a cross-sectional view along a longitudinal axis of a regenerative burner for non-symmetrical combustion according to a second embodiment of the present invention; and FIG. 6 is a front view of a regenerative burner for non-symmetrical combustion having an elongated burner port block according to a third embodiment of the present invention.

DESCRIPTION OF THE INVENTION

Figure 1:
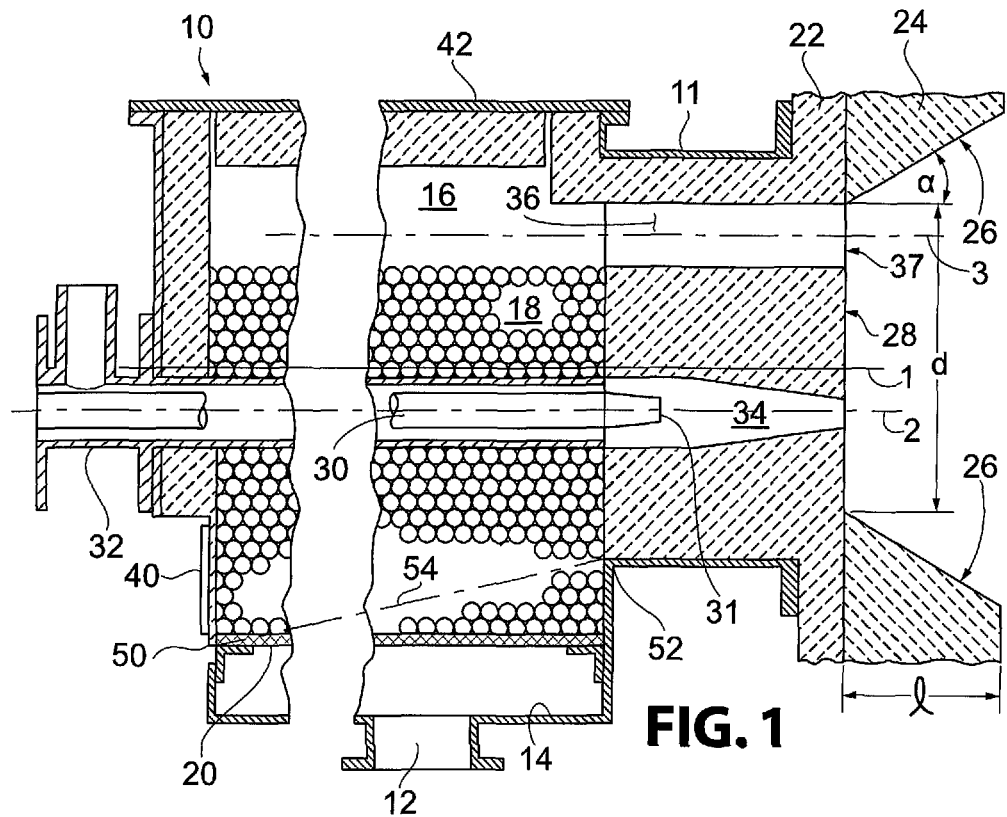
FIG. 1 is a cross-sectional view along a longitudinal axis of a regenerative burner for non-symmetrical combustion according to a first embodiment of the present invention.

Referring to FIGS. 1 and 5 a regenerative burner 10 for non-symmetrical combustion according to a first embodiment of the present invention is shown. The burner 10 includes a burner housing 11. The burner housing 11 defines a primary air inlet 12 and encloses a burner plenum 14. The primary air inlet 12 is in fluid communication with the burner plenum 14. The plenum 14 has a freeboard 16 defined above a bed of regenerative media 18. The media bed 18 is positioned within the plenum 14 and at least partially fills the plenum 14. The media bed 18 rests on a screen grate 20 positioned within the plenum 14 opposite the primary air inlet 12.

A baffle 22 is generally positioned between the plenum 14 and a burner port block 24. The burner port block 24 is connected to the baffle 22. A sidewall 26 of the burner port block 24 has a predetermined flare angle α preferably between approximately 2° and approximately 30°. The burner port block 24 has a linear thickness (l) and an inside diameter (d). Preferably, the ratio of the linear thickness to the inside diameter (l/d) is greater than or equal to 0.6 and less than or equal to 1.0. The baffle 22 further includes a baffle face 28.

The burner 10 has a geometric or burner centerline 1. A fuel conduit 30 extends in a longitudinal direction within the burner housing 11 and is positioned coaxial with an offset centerline 2 relative to the geometric centerline 1, giving the burner 10 a non-symmetric configuration, i.e., the offset centerline or central axis 2 of the fuel conduit 30 is spaced a distance from the geometric centerline 1 of the burner 10. The fuel conduit 30 defines a fuel exit opening 31. The fuel exit opening 31 may comprise a high velocity nozzle.

The baffle 22 defines a cavity 34 immediately downstream of the fuel exit opening 31. The cavity 34 is in fluid communication with the fuel conduit 30 through the fuel exit opening 31. The combustion gas conduit 32 extends through the burner plenum 14 and connects to the cavity 34. As shown in FIG. 1, the sidewall of the baffle 22 is concentrically positioned around the fuel conduit 30 and converges with respect to the central axis 2 of the fuel conduit 30 giving the cavity 34 the shape of a truncated cone. The cavity 34 is shown to be coaxial with the fuel conduit 30, but may also be offset from the fuel conduit 30.

Figure 2:
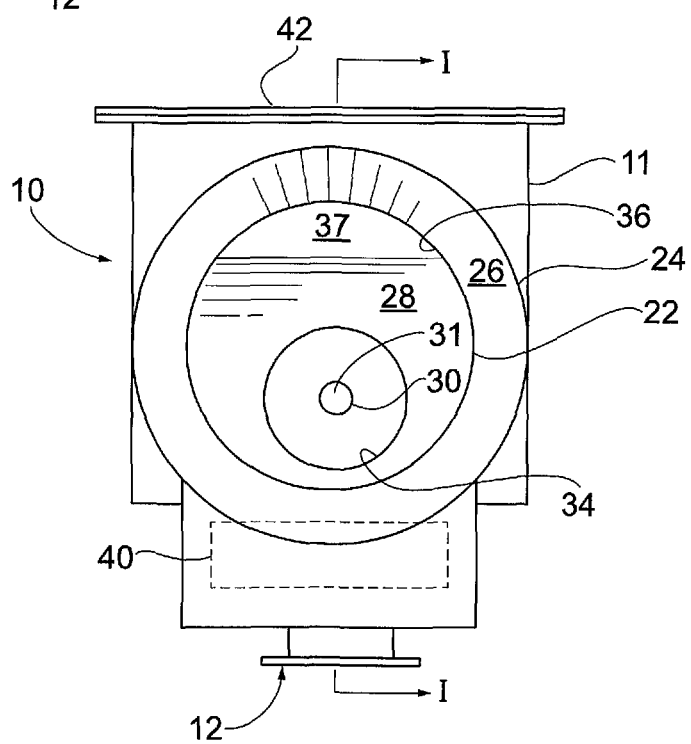
FIG. 2 is a front view of the burner shown in FIG. 1.

The baffle 22 also defines an air conduit 36 that extends into the burner housing 11 and connects to the burner plenum 14. The air conduit 36 defines an air opening 37. The air conduit 36 and the air opening 37 are positioned on an opposite side of the geometric centerline 1 from the fuel conduit 30 and the fuel exit opening 31. Preferably, the air conduit 36 and the air opening 37 are positioned a greater distance away from the geometric centerline 1 of the burner 10 than the fuel conduit 30 and the fuel exit opening 31 as shown in FIG. 6. The air conduit 36 preferably has a cross-sectional shape in the form of a segment of a circle defined by a chord, as shown in FIG. 2, and includes a central axis 3. In addition, the fuel conduit 30 may be oriented parallel to, or diverge away from, the air conduit 36.

The fuel conduit 30, in the embodiment shown in FIGS. 1 and 2, is nested within a combustion gas conduit 32. The combustion gas conduit 32 is connected to an outside source for supplying combustion gas, such as air or fuel gas, as described further hereinafter, and extends into the cavity 34.

This burner construction is advantageous in that the combustion gas conduit 32 and the fuel conduit 30 are positioned inside the regenerative media bed 18. Consequently, the combustion gas conduit 32 and the fuel conduit 30 are not exposed to high temperature products of combustion during the exhausting cycle or to high air temperatures during the firing cycle of the burner 10. Therefore, these elements do not require insulation. The combustion gas conduit 32 and the fuel conduit 30 are insulated by the media bed 18.

Alternatively, as shown in FIG. 5, the plenum 14 may be arranged such that the freeboard area 16 above the media 18 not only supplies air to the air conduit 36 defined by the baffle 22, but also to an annular space 58 formed between the outer surface of the fuel conduit 30 which extends into the baffle 22 and the sidewall of the portion of the baffle 22 surrounding the fuel conduit 30. The annular space 58 is selected to give a certain velocity based on the pressure and volume that will be supplied to assure that the air supplied through the air conduit 36 is at the proper velocity/pressure and effectively acts as an eductor.

Both of these embodiments eliminate the insulation and/or cooling that is necessary with prior art regenerative burners having the fuel conduit located coaxial with the burner centerline and having two air slots symmetrically arranged about the fuel conduit.

A cleanout door 40 is positioned in a lower portion of the burner 10 and opens into the media bed 18. A fill door 42 serves as the top section of the burner 10, creating access to the media bed 18 for filling and leveling of the media bed 18. The freeboard 16 is in fluid communication with the burner port block 24 through the air conduit 36 and the air opening 37. Swirl vanes may be provided in the combustion gas conduit 32 and be peripherally spaced about the fuel conduit 30. However, the swirl vanes are optional.

In operation, combustion air enters the primary air inlet 12 and expands slightly in the burner plenum 14 for distribution through the screen grate 20. The combustion air then propagates through the media bed 18 and flows into the freeboard 16. Fuel is introduced through the fuel conduit 30 at a velocity of between about 800 and 1200 feet per second and exits the fuel exit opening 31 along the central axis 2 of the fuel conduit 30, or first axis. The combustion air is accelerated through the air conduit 36 to a velocity greater than 250 feet per second and exits the air opening 37 along the central axis 3 of the air conduit 36, or second axis. The combustion air velocity in the burner plenum 14 will be on the order of 40-60 feet per second, and in the freeboard 16 on the order of 60-80 feet per second.

The combustion air discharges as an air jet from the air opening 37 at the baffle face 28 into the burner port block 24. The air jet will, by Coanda Effect, tend toward the sidewall 26 of the burner port block 24 at approximately the flare angle α. The discharging air jet and the fuel exiting the fuel exit opening 31 are then mixed in the opening defined by the burner port block 24 and ignited. Products of combustion from the combustion process, which have been partially cooled by giving up heat in the process, are recirculated back into the air jet discharging from the air opening 37 and into the void generated by the remaining blockage of the baffle 22. The main combustion air exiting the air opening 37 is vitiated by the recirculated products of combustion.

Figure 3:
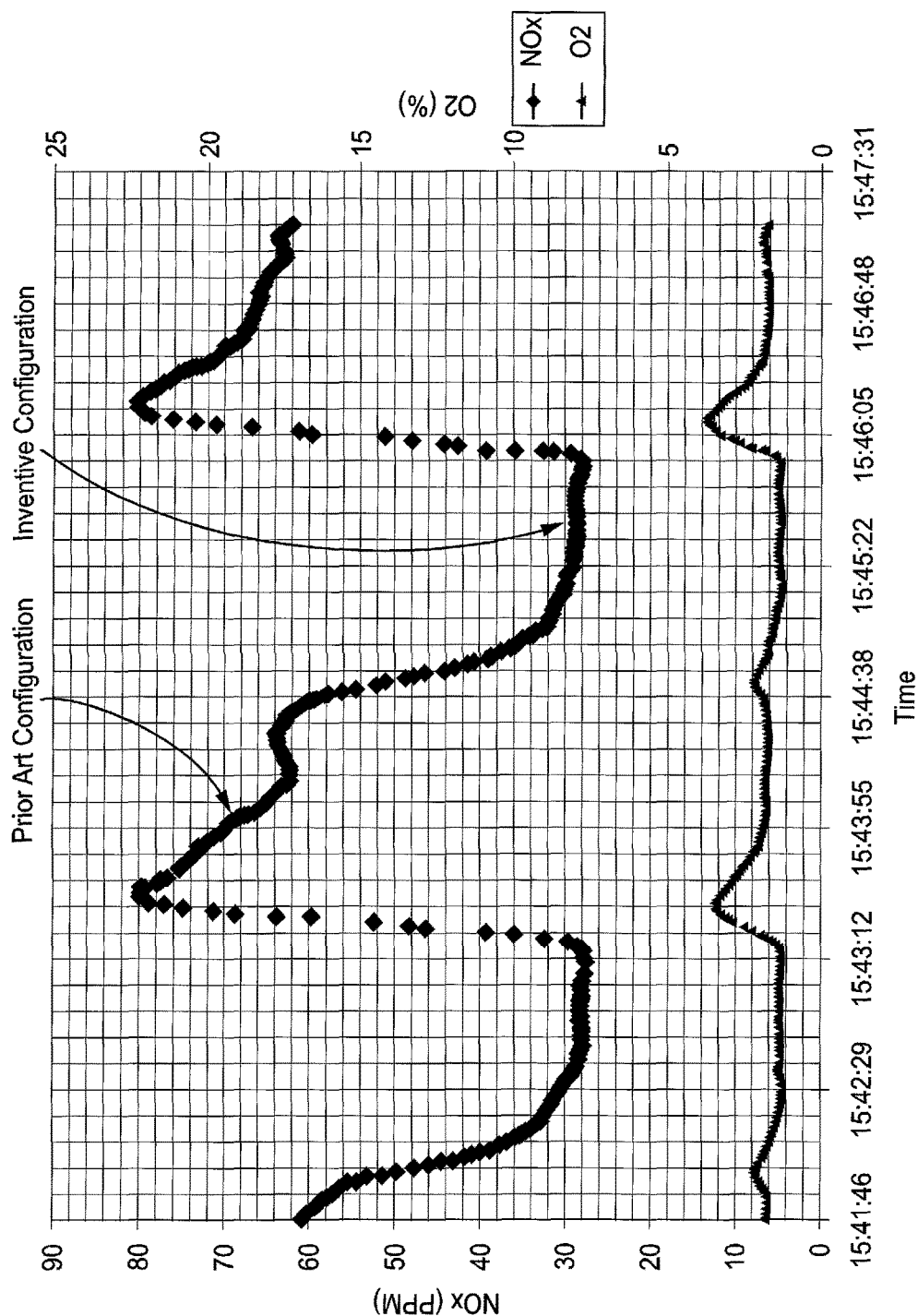
FIG. 3 is a graph showing a comparison in NOx for a prior art regenerative burner configuration and the inventive regenerative burner configuration for a furnace at 2300° F.

Due to the converging sidewall of the cavity 34, the fuel travels a significant distance into the opening defined by the burner port block 24 before mixing with the air and igniting. This allows for further vitiation of the air by the recirculated products of combustion before mixing with the fuel and acts to reduce the NOx during combustion. This effect can be seen in FIG. 3 which compares temperature profiles for the inventive configuration and for a prior art configuration. In the prior art configuration, it can be seen that the fuel jet is being pulled toward the air jet much more rapidly than in the inventive configuration.

With the fuel introduced along the offset centerline 2 compared to the geometric centerline 1 and introduced a significant distance into the opening defined by the burner port block 24 before mixing with the air as described above, the inventors have achieved test results suggesting that NOx emission levels may be reduced to approximately 50% of the levels achieved by regenerative burners having the fuel conduit located coaxial with the burner centerline and having two air slots symmetrically arranged about the fuel conduit, FIG. 4.

The preferred ratio of the linear thickness (l) between the baffle face 28 and the hot face of the burner port block 24 compared to the inside diameter (d) of the opening in the burner port block 24 at its upstream end should be equal to or less than 1, i.e., $l/d \leq 1.0$. This assures that recirculated products of combustion have been sufficiently cooled prior to coming into contact with the combustion air and the fuel gas. Additionally, this moves the combustion reaction farther away from the burner tile structure, reducing the generation of radiant heat.

As stated previously, the air conduit 36 preferably has a cross-sectional shape in the form of a segment of a circle defined by a chord, as shown in FIG. 2. Hence, the air opening 37 also defines such a shape. The baffle 22 acts as a dam to retain the media bed 18 in place within the burner plenum 14 in the housing 11 of the burner 10. The chord geometry of the air opening 37 is advantageous in that it exposes the optimum amount of combustion air flow to the sidewall 26 of the burner port block 24, thus optimizing the benefits of the Coanda Effect. The sizing of the chord and, hence, the circle segment will depend on the parameters of the system in which the burner 10 is to be utilized, with the main design criteria being that the chord must be located appropriately to obtain a velocity for the combustion air of 250 feet per second or more through the air opening 37 into the burner port block 24.

In a cold startup situation of the burner 10, which occurs when the furnace temperature is less than 1600° F., a portion of the combustion air is delivered through the combustion gas conduit 32, either axially or through the swirl vanes. Thus, a portion of the combustion air is delivered concentrically around the fuel jet injected from the fuel exit opening 31 and substantially parallel thereto. As stated previously, the swirl vanes are optional in the burners 10 of FIGS. 1 and 5. Fuel is introduced through the fuel conduit 30 at a high velocity, greater than 500 feet per second and preferably, greater than 800 feet per second. As stated previously, the fuel conduit 30 may be parallel to, or it may be diverted away from, the air conduit 36. The divergent arrangement will increase the delay for mixing of the burner fuel and the combustion air.

The design of the fuel jet and the cavity 34 serve to achieve a jet mixture which penetrates further into the furnace allowing a greater level of products of combustion entrainment prior to combustion than in prior art designs, as shown by the circles in FIG. 4. As mentioned previously, the main combustion air exiting the air opening 37 is also vitiated by recirculating products of combustion.

Other features of the present invention shown in FIGS. 1 and 2 will now be discussed. When the mass velocity through the plenum 14 is high enough to fluidize the media bed 18, larger, heavier media bed elements may be placed in the upper portion of the plenum 14 to contain the media bed 18 and to prevent its fluidization. In addition, the screen grate 20 shown in FIG. 1 may be inclined at an angle between connecting points 50 and 52 to further reduce the size of the burner 10. This particular variation is represented by dashed line 54 in FIG. 1. The cleanout door 40 located adjacent the media bed 18 is in a low temperature region of the burner 10 and, consequently, does not require lining. The freeboard 16 advantageously permits the air exiting the media bed 18 to equalize prior to being accelerated through the air conduit 36. Conversely, the burner 10, when in its exhausting cycle, will have products of combustion firing back through the air opening 37 and the air conduit 36 into the freeboard 16 for equalization and penetration across the media bed 18.

FIG. 6 shows a second embodiment of the burner 10. The burner 10 shown in FIG. 6 has an elongated burner port block 24. This configuration provides further separation between the fuel exit opening 31 and the air opening 37. The increased separation permits additional furnace flue gas to recirculate back into the area between the fuel jet exiting the fuel exit opening 31 and the air stream exiting the air opening 37. Combustion is started inside the furnace wall in a traditional manner and the burner 10 shown in FIG. 6 operates in an otherwise similar manner to the burners 10 discussed hereinabove.

The configuration of the air opening 37 in the form of a circle segment defined by a chord is advantageous for two additional reasons. First, this configuration is easier to mold in the baffle 22. Second, the chord configuration provides a better dam for the elements in the media bed 18 in the regenerative version of the invention.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:
1. A burner for non-symmetrical combustion, comprising:
   a burner housing enclosing a burner plenum;
   a fuel conduit extending longitudinally within the housing and positioned coaxial with an axis spaced from a central axis of the burner, with the fuel conduit defining a fuel exit opening;

an air conduit extending into the housing, with the air conduit defining an air opening on an opposite side of the burner central axis from the fuel exit opening; and a baffle positioned at least partially around the fuel conduit and defining the air conduit, wherein the baffle further defines a cavity that surrounds a portion of the fuel conduit and extends beyond the fuel exit opening, wherein at least a portion of a sidewall of the baffle defining the cavity converges from the axis of the fuel conduit, and wherein in the area in which the cavity surrounds the portion of the fuel conduit, an outer surface of the fuel conduit and the sidewall of the baffle immediately and directly define an annular opening extending from the burner plenum into the cavity.

2. The burner of claim 1, further comprising a burner port block connected to the baffle and located downstream of and in fluid communication with the fuel conduit and the air conduit.

3. The burner of claim 2, wherein a sidewall of the burner port block diverges from the burner central axis.

4. The burner of claim 3, wherein the sidewall of the burner port block diverges at a flare angle of between 2° and 30°.

5. The burner of claim 2, wherein the baffle separates the burner port block from the burner plenum.

6. The burner of claim 1, wherein the fuel exit opening is a high velocity nozzle.

7. The burner of claim 1, wherein the air conduit has a cross-sectional shape in the form of a segment of a circle defined by a chord.

8. The burner of claim 1, wherein the cavity has the shape of a truncated cone and is coaxial with the fuel conduit.

9. The burner of claim 1, wherein a second air conduit extends through the burner plenum and connects to the cavity, and wherein the fuel conduit is positioned within the air conduit.

10. The burner of claim 9, further comprising swirl vanes positioned within the second air conduit and peripherally spaced around the fuel conduit.

11. The burner of claim 1, wherein the burner plenum is at least partially filled with heat transfer media.

12. The burner according to claim 1, wherein the air opening is positioned a greater distance away from the burner central axis than the fuel exit opening.

13. The burner according to claim 1, wherein the fuel exit opening is positioned at an end of the fuel conduit and the end of the fuel conduit adjacent the fuel exit opening is tapered.

14. A method of non-symmetric combustion in a burner, comprising the steps of:

providing a burner, with the burner comprising:

a burner housing enclosing a burner plenum;

a fuel conduit extending within the housing and positioned coaxial with a first axis having a fuel exit opening;

an air conduit coaxial with a second axis;

a baffle positioned at least partially around the fuel conduit and also defining the air conduit; and a burner port block having a diverging sidewall connected to the baffle and in fluid communication with the fuel conduit and air conduit, wherein the baffle further defines a cavity that surrounds a portion of the fuel conduit and extends beyond the fuel exit opening and at least a portion of a sidewall of the baffle defining the cavity converges from the first axis, wherein in the area in which the cavity surrounds the portion of the fuel conduit, an outer surface of the fuel conduit and the sidewall of the baffle immediately and directly define an annular opening extending from the burner plenum into the cavity;

injecting fuel through the fuel conduit into the burner port block along the first axis, with the first axis spaced from a central axis of the burner;

discharging combustion gas through the air conduit into the burner port block along the second axis, with the second axis positioned on an opposite side of the burner central axis from the first axis;

inducing the combustion gas to flow toward the diverging sidewall of the burner port block;

mixing the combustion gas and the injected fuel;

igniting the mixed combustion gas and injected fuel; and recirculating products of combustion into the discharging combustion gas.

15. The method of claim 14, wherein the discharging combustion gas discharges at a velocity of greater than about 250 feet per second into the opening.

16. A burner for non-symmetrical combustion, comprising:

a burner housing enclosing a burner plenum comprising a freeboard area and heat transfer media;

a fuel conduit extending within the housing, with the fuel conduit defining a fuel exit opening;

an air conduit extending into the housing, with the air conduit defining an air opening on an opposite side of a central axis of the burner from the fuel exit opening; and a baffle positioned at least partially around the fuel conduit and defining the air conduit, wherein the baffle further defines a cavity immediately adjacent the fuel exit opening and in fluid communication with the fuel conduit through the fuel exit opening, a sidewall of the baffle defining the cavity converges from a central axis of the fuel conduit, wherein the fuel conduit is positioned at least partially within the baffle and an outer surface of the fuel conduit and a sidewall of the baffle define an annular opening, and wherein air is supplied to the annular opening from the freeboard area of the plenum.

17. The burner of claim 16, further comprising a burner port block connected to the baffle and located downstream of and in fluid communication with the fuel conduit and the air conduit, wherein a sidewall of the burner port block diverges from the burner central axis.

18. The burner of claim 16, wherein the cavity has the shape of a truncated cone and is coaxial with the fuel conduit.

19. The burner according to claim 16, wherein the air opening is positioned a greater distance away from the burner central axis than the fuel exit opening.

* * * * *